A. BENNINGHOFEN.
Improvement in Seasoning Wagon Hubs.

No. 115,017.  Patented May 23, 1871.

Attest
Philip M. Shuey
Luther Van Orden

Inventor
August Benninghofen 115,017

UNITED STATES PATENT OFFICE.

AUGUST BENNINGHOFEN, OF HAMILTON, OHIO, ASSIGNOR TO BENNINGHOFEN, NORTHRUP & CO., OF SAME PLACE.

IMPROVEMENT IN SEASONING WAGON-HUBS.

Specification forming part of Letters Patent No. 115,017, dated May 23, 1871.

I, AUGUST BENNINGHOFEN, of the city of Hamilton, in the county of Butler and State of Ohio, have invented certain new and useful Improvements in the Process of Seasoning Hubs, of which the following is a specification:

My invention consists in coating the ends of hubs for vehicles with a substance or substances hereinafter described, thereby preventing the ends of the hubs from cracking during the process of seasoning, and accomplishing the seasoning itself in one-quarter of the time re-required for seasoning hubs when the bark is left on them, as well as obviating all necessity of retaining the bark on the said hubs during said seasoning.

Figure 1:
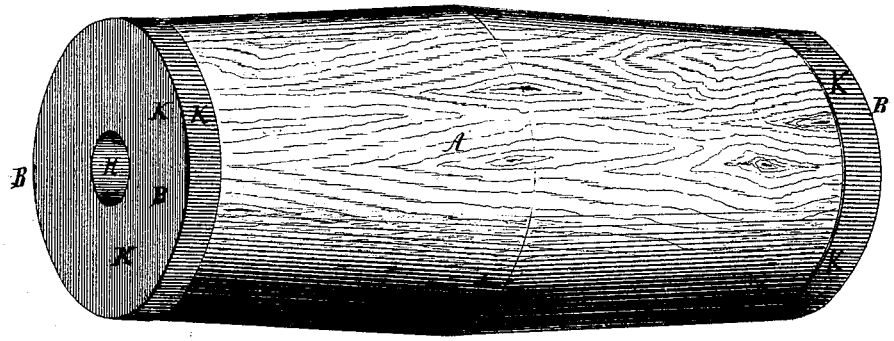
Figure 2:
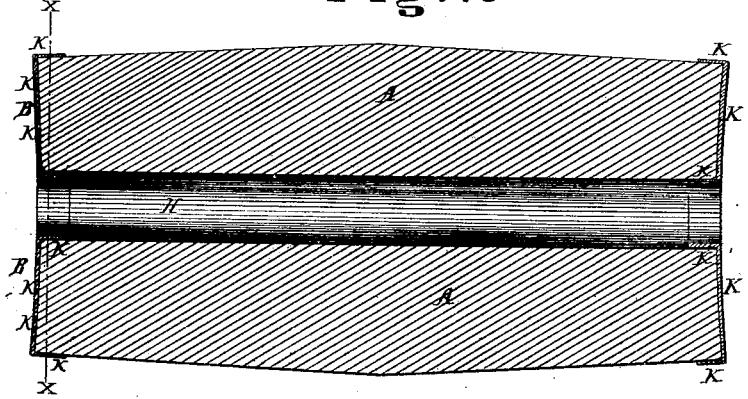
Figure 3:
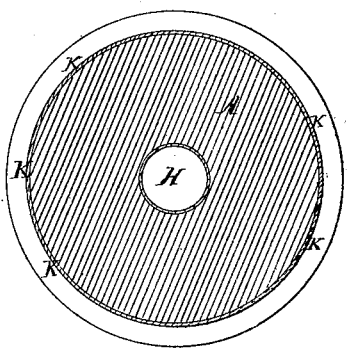

In the accompanying drawing, Figure 1 is a hub prepared for seasoning according to my invention. Fig. 2 is a longitudinal vertical section of Fig. 1 taken at the line X X in Fig. 2.

General Description.

A is a piece of timber from which the bark has been removed, and which has been cut down to a cylindrical shape, of a size proper to be afterward manufactured into a perfect hub; in other words, it is the hub in the rough. B B are the ends of the hub, made slightly concave. H is the air-hole running lengthwise through the center of the hub. K K K is a coating, hereinafter described, covering each end of the hub. This coating also extends from each end, respectively, a short distance into the hole H, and also a short distance upon the periphery of the hub. This coating may be pitch or resin, or either of these substances mixed with tar; or it may be any adhesive viscous substance which will harden and will completely close the pores of the wood it covers.

The mode of coating the hub is very simple: The timber being bored, the bark removed from it, it is reduced to the shape shown in the drawing, or to any size and shape best suited for its subsequent manufacture for a particular style of wheel. The substance used for coating being rendered liquid, one end of the hub is dipped into said coating, care being taken that the hub is immersed sufficiently to cause the coating to rise a short distance above the end upon the periphery. As soon as the immersed end is well coated it is removed, and the other end of the hub immersed and coated in like manner.

If preferred, the coating may be applied in other ways, as, for example, with a brush.

The advantage of thus coating the ends of the hub is that the longitudinal pores of the wood are completely closed to the ingress of moisture and air, thus preventing decay, and also the cracking and splitting open of said ends.

Heretofore the ends of hubs from which the bark has been removed have been painted to prevent their cracking; but paint has failed to entirely prevent such cracking. Twenty per cent. of hubs whose ends are prepared with paint are ruined by the cracking of the ends.

Claim.

The process of seasoning hubs by coating them with a viscous material, which will harden and will completely close the pores of said hubs.

AUGUST BENNINGHOFEN.

Witnesses:
 PHILIP M. SHUY,
 LUTHER VAN ORDEN.